3,099,202
FRANKFURTER COOKER
Reed A. Palmer, Mansfield, Ohio, assignor to Westinghouse Electric Corporation, East Pittsburgh, Pa., a corporation of Pennsylvania
Filed Apr. 30, 1959, Ser. No. 810,077
3 Claims. (Cl. 99—337)

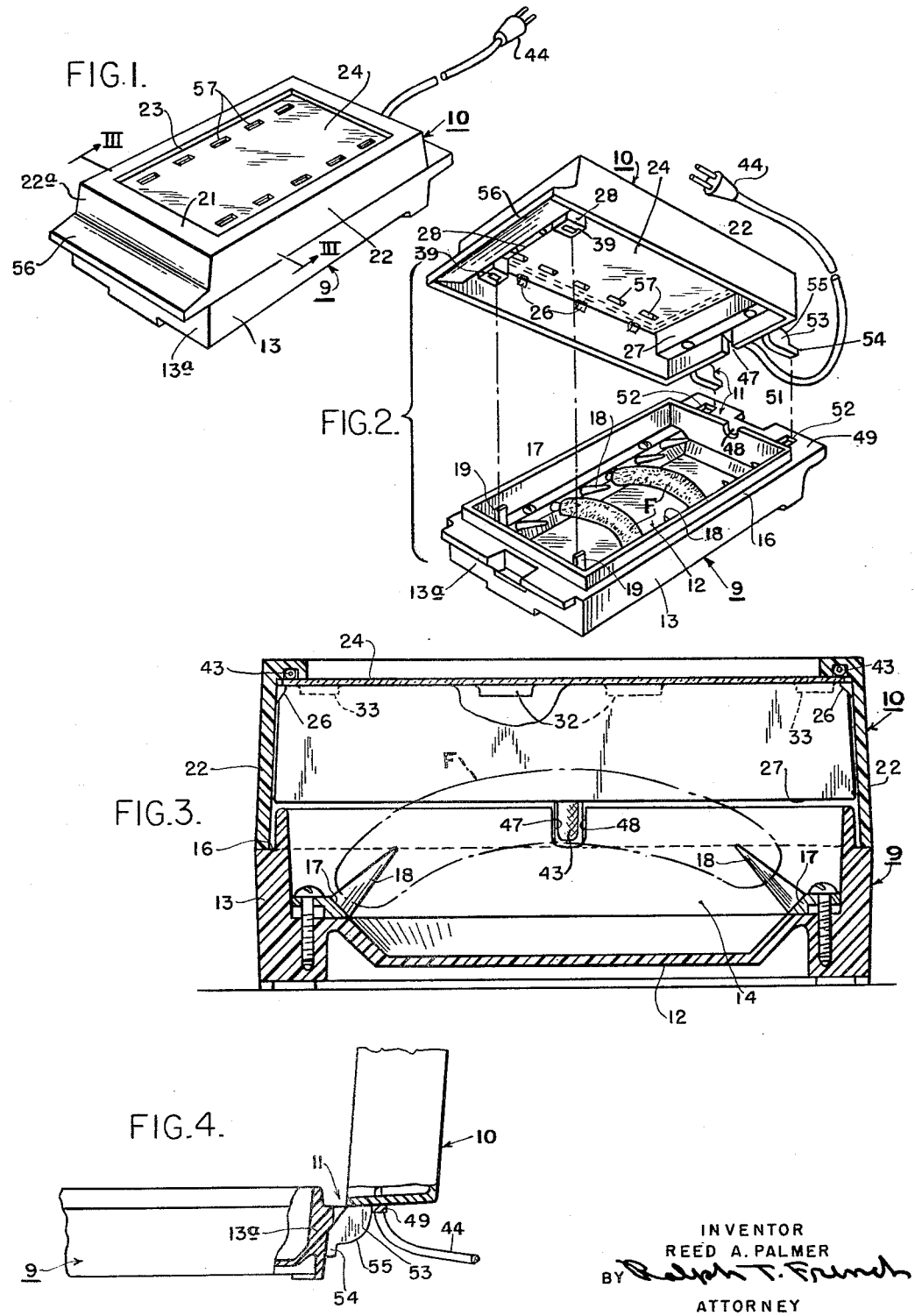

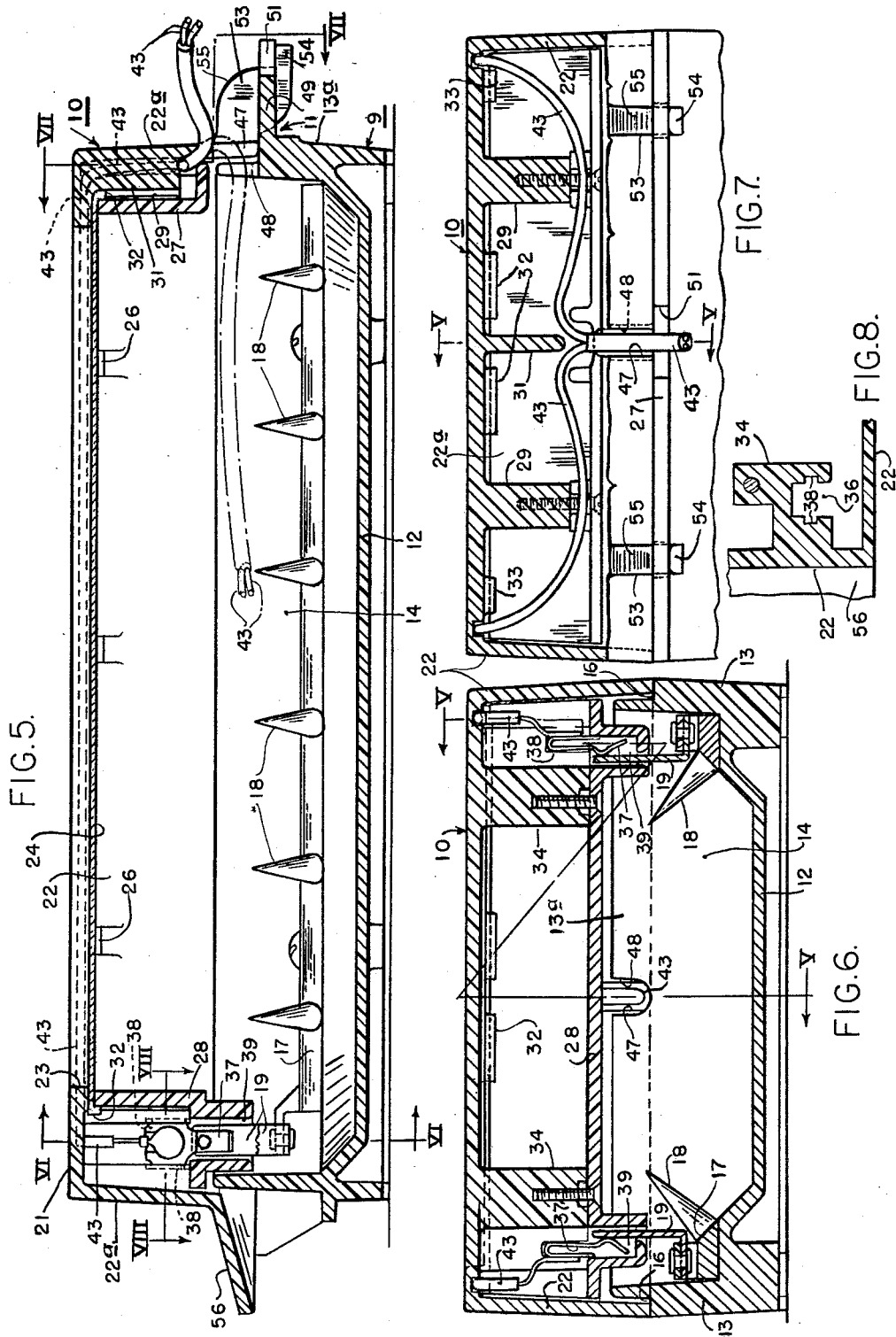

This invention relates to cooking devices, more particularly to electrical frankfurter cookers wherein the cooking is effected by passage of electric current through the frankfurter, and has for an object to provide an improved device of this character.

Another object of the invention is to facilitate thorough cleaning of the main body of a frankfurter cooker.

Yet another object of the invention is to render the main body portion of a frankfurter cooker completely immersible without electric shock hazard.

A further object of the invention is to facilitate storage of an electrical supply cord secured to a cooking vessel.

These and other objects are effected by the invention as will be apparent from the following description taken in connection with the accompanying drawings, forming a part of this application, in which:

FIG. 1 is a perspective view of a complete frankfurter cooker;

FIG. 2 is an exploded perspective view of the frankfurter cooker of FIG. 1;

FIG. 3 is a transverse sectional view taken along the line III—III of FIG. 1, looking in the direction indicated by the arrows;

FIG. 4 is a fragmentary side elevational view of the frankfurter cooker with the cover in open position, a portion of the structure being shown in section to more clearly illustrate novel features of the construction;

FIG. 5 is a longitudinal sectional view taken along the line V—V of FIG. 6, looking in the direction indicated by the arrows;

FIG. 6 is a transverse sectional view taken along the line VI—VI of FIG. 5, looking in the direction indicated by the arrows;

FIG. 7 is a transverse sectional view taken along the line VII—VII of FIG. 5, looking in the direction indicated by the arrows; and, FIG. 8 is a fragmentary horizontal sectional view taken along the line VIII—VIII of FIG. 5, looking in the direction indicated by the arrows, and with the electrical terminal omitted.

Referring now to the drawings, particularly FIGS. 1, 2 and 3 thereof, there is shown a device for cooking sausages of the frankfurter type, particularly those of the so-called "hot dog" type, although it will be apparent that its use is not limited to the cooking of frankfurters or "hot dogs," but it may be used for cooking any type of food which is available in the general shape and size of frankfurters.

The frankfurter cooker herein illustrated includes a body or base 9, of plastic or other suitable moldable material, and a cooperating cover 10 of the same material. A novel feature of the invention resides in the hinge structure 11, which provides for pivotal mounting of the cover 10 on the base 9, while at the same time permitting free and convenient separation of the cover from the base, so that the latter may be completely immersed for easy and thorough cleaning thereof.

The base 9 has wall structure including a bottom wall 12 and side walls 13 joined by shorter side walls 13a, the bottom and side walls cooperating to define a cooking well. Two bus bars 17 are disposed in parallel relationship within the cooking well adjacent opposite side walls 13 and carry a plurality of electrodes 18 which preferably are pointed and which project upwardly and inwardly with respect to the well 14, for ready reception of the terminal portions of frankfurters F. The electrodes 18 may be cast integral with the bus bars 17, or secured thereto in any suitable manner, and both the electrodes and the bus bars are of a material having good electrical conductive characteristics. The bus bars 17 carry upwardly-directed plug or contact fingers or terminals 19 at the ends of the bus bars which are remote from the hinge structure 11, for cooperation with a mating pair of electrical terminals carried by the cover 10, as will be described later.

The cover 10 has wall structure including a top wall 21 having depending side walls 22, joined by shorter side walls 22a. The top wall 21 is provided with a relatively large rectangular opening therethrough which is closed by a window 24, formed of a sheet of transparent plastic or glass or by a perforated grid of insulating material. As shown in FIGS. 3 and 5, the window 24 is supported at its longitudinal edges by a plurality of lugs 26 molded integral with the cover and projecting inwardly from the cover side walls 22. The window is supported at its ends by a strain relief member 27 adjacent the hinge end of the cover and by a terminal housing 28 adjacent the opposite end of the cover.

The strain relief member 27 is of L-shape in cross section, the leg of the L engaging the inner edges of a pair of vertical ribs 29 and an intermediate rib 31 formed integral with the cover end wall 22a, at the hinge end of the device. The foot portion of the L-shaped strain relief member engages the lower ends of the vertical ribs 29 and 31 and the entire strain relief member 27 is secured in position by suitable means, such as screws extending through he foot of the L and into threaded recesses provided in the ribs 29. The window 24 is prevented from sagging by the provision of lugs 32 and 33 depending from the hinge end of the window (FIG. 3). These lugs fit over and engage against the upper end of the strain relief member.

At the end of the cooking device remote from the hinge structure, the window structure 24 is similarly supported by the terminal housing 28, which also is of generally L-shaped cross section and is similarly secured against a pair of vertical ribs 34 molded integrally with the front wall 22a of the cover. Similar lugs 32 and 33, carried by the window, engage the upper end of the terminal housing 28.

As best shown in the horizontal section in FIG. 8, the vertical ribs 34 at the front of the cover are formed with vertical recesses 36 for reception and retention of a pair of electrical terminals 37 which may be of conventional construction, the opposite edges of the terminals being frictionally received in opposed grooves 38 formed in opposite side walls of the vertical recesses 36. In assembly, these electrical terminals 37 are slid vertically into the opposed grooves 38 until they abut the bottoms of the grooves, with the result that they are limited in their upward movement. As best shown in FIGS. 5 and 6, the terminal housing 28 includes a pair of depending structures defining sockets or wells 39 disposed to receive spring contact portions of the electrical terminals 37. The depending sockets 39 of the terminal housing 28 are positioned directly above the upwardly-directed plug or contact fingers or terminals 19, carried by the bus bars 17 in the base, and are provided with openings for passage of the plug or contact fingers 19 when the cover is closed, so that the fingers 19 may frictionally engage the spring contacts to provide an electric circuit to the bus bars.

The electrical terminals 37 have circuit-providing wires 43 connected thereto, the wires extending through the cover, in the area of the hinge, in the form of a cord and terminating in the usual electrical plug 44.

As best shown in FIGS. 3, 6 and 7, the cover top wall 21 is provided, near the cover edges, with longitudinally-extending grooves in which the wires 43 are disposed and are retained by the window 24, which covers the otherwise open sides of the grooves. As shown in FIG. 7, the wires leave the grooves in the space between the strain relief member 27 and the adjacent cover side wall 22a, passing the vertical ribs 29 at the lower ends thereof and leaving the cover through opening 47 in the lower portion of the cover side wall 22a. As best shown in FIG. 5, an opening 48 is provided in the upper portion of the base side wall 13a, in alignment with cover opening 47 when the cover is closed, thereby providing ample clearance for the cord at this point when the cord is stored within the cooker during non-use (see dot-dash showing of FIG. 5).

The hinge structure 11 includes a horizontal flange 49, projecting rearwardly from the adjacent wall 13a of the base 9, this flange being provided with a rearwardly-opening notch 51 centrally located with respect to the ends of the flange 49 (FIG. 2). This notch 51 provides clearance for the plug cord when the cover is in the open position, illustrated in FIG. 4. The horizontal flange 49 also contains a pair of spaced openings 52 therethrough for reception of a mating pair of spaced lugs 53 projecting rearwardly and downwardly from the adjacent wall 22a of the cover. When the cover is in its opened position, shown in FIG. 4, the lugs 53 abut the adjacent wall 13a of the base and limit the opening movement of the cover. In this position, the cover side wall 22a rests on, and is supported by, the horizontal flange 49. The lugs have rearwardly extending ears 54 which, when the cover is closed, as best shown in FIG. 5, engage under that portion of the flange 49 which forms the rear wall of the openings 52, thus positively preventing separation of the cover from the base while the cover is closed. With the cover in the open position of FIG. 4, it may be completely separated from the base by raising it vertically to withdraw the lugs 53 from the flange openings 52.

Referring again to FIG. 4, it will be seen that, with the cover in open position, there is substantial clearance between the cover lugs 53 and the flange openings 52. This clearance is between the cover and the base, as a result of movement of the cover in a direction rearwardly relative to the base during opening of the cover. The hinge lugs 53 are formed with cam surfaces 55, which abut the rear walls of the openings 52 to move the cover forwardly relative to the base as the cover is lowered, thereby assuring that the cover walls are aligned with the rabbetted walls of the base as they approach overlapping position.

The cover may be provided, at its side remote from the hinge structure, with a forwardly projecting flange 56 serving as a handle by which the cover may be raised and lowered.

It is believed that the operation of this frankfurter cooker will be apparent. However, it may be mentioned that with the cover in the open position shown in FIG. 4, the user may place frankfurters upon opposed pairs of electrodes 18, with the electrodes piercing the terminal portions of the frankfurters as best shown in FIG. 3. When the cover is closed, the contact fingers or terminals 19, carried by the bus bars 17, extend through the openings in the depending sockets 39 of the terminal housing 28 and frictionally engage the spring fingers of the electrical terminals 37, thereby establishing an electric circuit from one terminal through the cooperating finger 19 to the bus bar associated therewith, and thence through the frankfurters themselves to the other bus bar and through the fingers 19 of the latter to the mating spring finger and the other wire to the source of electric current. As is well known in this art, the frankfurter structure produces an electrical resistance resulting in generation of heat within the frankfurter effecting rapid cooking of the latter, usually within about a minute and a half. In the event the cooker is left "on" after the frankfurters are cooked, no harm results, as a thin film of the meat in contact with the electrodes dries, and flow of current then ceases.

An important feature of the present invention lies in the overlapping arrangement of the cover side walls 22, 22a with respect to the upper portions of the base side walls 13, 13a, which are rabbetted, at 16, for reception of the lower edges of the cover side walls, with the result that, when the cover is moved towards closed position, by the time the terminals engage to establish an electric circuit through the bus bars, the base and cover walls have overlapped, thereby rendering it impossible for the user, particularly a child, to insert his fingers within the device and receive a shock.

A further important feature of the invention is the hinge structure which, while functioning as a hinge during normal opening and closing of the cover relative to the base, permits the cover to be readily separated completely from the base, with the result that the latter, which receives any drippings from the cooking frankfurters, may be completely immersed for thorough cleansing without any danger whatsoever of electrical shock. The cover 10, which, at most, receives only slight steam from the cooking frankfurters, may be readily cleansed by wiping with a damp cloth.

To vent any steam that may develop in the cooking and to reduce the ambient temperature within the closed cooking device, it is preferred that the window 24 be provided with a plurality of openings 57, which, in the embodiment herein illustrated, are arranged in a decorative fashion in a plurality of rows, as shown in FIG. 1.

While the invention has been shown in but one form, it will be obvious to those skilled in the art that it is not so limited, but is susceptible of various changes and modifications without departing from the spirit thereof.

What is claimed is:

1. In a two-part frankfurter cooker, a base including a bottom wall and four side walls defining a cooking well, a pair of electrically conductive bus bars disposed in said well adjacent opposite side walls thereof, a pair of electrical contact fingers having electrical connections with said pair of bus bars and projecting upwardly from the base, a plurality of electrodes carried by each of said bus bars and projecting into said cooking well for reception, on opposed pairs thereof, of the terminal portions of frankfurters to be cooked, a cover for said cooking well, a pair of downwardly opening electrical sockets carried by the cover in alignment with said contact fingers for reception of an electrical contact with the latter when the cover is in closed position, means carried by said cover for providing an electrical circuit between said sockets and an electrical supply source, and hinge means pivotally mounting said cover on the base, said hinge means including a pair of interfitting parts, one of said interfitting parts comprising a flange projecting horizontally from the base and having a pair of spaced openings therethrough, the other of said interfitting parts comprising a pair of spaced lugs projecting from the corresponding side of the cover for reception in said openings of the base flange, said lugs and openings being so shaped and disposed that they mount the cover for pivotal movement relative to the base between a closed position where the lugs are inseparable from the base flange openings and an open position wherein the lugs are readily separable from said openings for ready removal of the cover from the base, whereby said base may be completely immersed for cleaning without electrical shock hazard.

2. In a frankfurter cooker, a base including a bottom wall and side walls defining a cooking well, a pair of parallel electrically-conductive bus bars disposed in said well at opposite sides thereof, a plurality of pointed electrodes carried by each of said bus bars and projecting into said cooking well for reception, on opposed pairs thereof, of the terminal portions of frankfurters to be cooked, a cover for said cooking well including a top wall and side walls, said cover side walls lapping said base side walls when said cover is in closing position with respect to said well, an upwardly-directed plug finger of electrically-conductive material carried by each of said bus bars, a pair of downwardly-opening electrical sockets carried by the cover in alignment with said plug fingers for reception of and contact with the latter when the cover is in closed position, means carried by said cover for providing an electrical circuit between said sockets and an electrical supply source, a horizontal flange projecting from the base at one end thereof and having a pair of spaced openings therethrough, a pair of spaced lugs projecting from the corresponding end of the cover for reception in said openings of the base flange, said lugs and openings being so shaped and disposed that they mount the cover for pivotal movement relative to the base between a closed position wherein the lugs are inseparable from the base flange openings and an open position wherein the lugs are readily separable from said openings for removal of the cover from the base, whereby said base may be completely immersed for cleaning without electrical shock hazard, and the shapes and dispositions of said lugs and openings being such that with the cover in open position substantial clearance exists between said lugs and the forward walls of said openings, and cam surfaces on the lugs engaging with the rear walls of the openings during movement of the cover to closed position for moving the cover forwardly relative to the base to assure lapping alignment of the base and cover side walls.

3. In a frankfurter cooker, a base including a bottom wall and four side walls defining a cooking well, a pair of electrically conductive bus bars disposed in said well adjacent opposite side walls thereof, a pair of electrical contact fingers having electrical connections with said pair of bus bars and projecting upwardly from the base adjacent a side wall of the latter, a plurality of electrodes carried by each of said bus bars and projecting into said cooking well for reception, on opposed pairs thereof, of the terminal portions of frankfurters to be cooked, a cover for said cooking well, and separable hinge means for rendering said cover and base readily separable when the cover is in open position and for rendering said cover and base inseparable when the cover is in closed position, said separable hinge means pivotally mounting said cover on the base side wall opposite the side wall which the contact fingers are adjacent for movement between open and closed positions, said hinge means including a pair of interfitting parts one carried by the cover and the other carried by the base side wall.

References Cited in the file of this patent
UNITED STATES PATENTS

| | | |
|---|---|---|
| 1,589,507 | Bond | June 22, 1926 |
| 2,052,919 | Brogdon | Sept. 1, 1936 |
| 2,344,373 | Stainbrook | Mar. 14, 1944 |
| 2,677,479 | Kiba | May 4, 1954 |
| 2,895,407 | Gomersall | July 21, 1959 |
| 2,924,167 | Rhodes | Feb. 9, 1960 |
| 2,951,434 | Williams | Sept. 6, 1960 |
| 2,980,010 | Williams | Apr. 18, 1961 |